United States Patent [19]

Bridenne Alaux et al.

[11] Patent Number: 4,857,294

[45] Date of Patent: Aug. 15, 1989

[54] PROCESS FOR THE PREPARATION OF METAL FLUORIDES USABLE FOR THE PRODUCTION OF FLUORIDE GLASSES

[75] Inventors: Martine Bridenne Alaux, Paris; Hubert Marquet-Ellis, Versailles; Nelly Keller, Les Ulis; Gerard Folcher, deceased, late of Orsay, all of France, by Vereina Folcher, heiress, Vincent Folcher and Marc Folcher, heirs

[73] Assignee: Commissariat A L'Energie Atomique, Paris, France

[21] Appl. No.: 76,309

[22] Filed: Jul. 22, 1987

[30] Foreign Application Priority Data

Jul. 23, 1986 [FR] France .................................. 8610697

[51] Int. Cl.⁴ .......................... C01B 9/08; C01F 7/50; C01G 25/04
[52] U.S. Cl. .................................... 423/489; 423/490; 501/40
[58] Field of Search .................... 423/489, 126, 85, 82, 423/294, 293, 490; 501/40

[56] References Cited

U.S. PATENT DOCUMENTS

| | | | |
|---|---|---|---|
| 2,784,059 | 3/1957 | McCaulay | 423/489 |
| 2,789,882 | 4/1957 | Sprague | 423/489 |
| 3,314,749 | 4/1967 | Fukui et al. | 423/489 |
| 4,034,070 | 7/1977 | Wojtowicz et al. | 423/489 |
| 4,474,743 | 10/1984 | Marlett | 423/489 |

FOREIGN PATENT DOCUMENTS 0052354 12/1981 European Pat. Off. ........... 75/0.5 B
0196666 2/1986 European Pat. Off. .

Primary Examiner—John Doll
Assistant Examiner—Jeffrey E. Russel
Attorney, Agent, or Firm—Nutter, McClennen & Fish

[57] ABSTRACT

A process for the preparation of metal fluorides usable for the production of fluoride glasses consists of reacting in an organic liquid medium, such as toluene, (a) a compound of said metal chosen from among the gaseous compounds thereof, the compounds of said metal soluble in the organic liquid medium and the compounds of said metal in solution in an organic solvent miscible with said medium, and (b) a fluorinating agent chosen from among the gaseous fluorinating agents, the fluorinating agents which are partly soluble in the organic medium and the fluorinating agents which are partly soluble in an organic solvent miscible with said medium, to form a fluoride of said metal, the organic liquid medium being such that it reacts neither with the compound of the metal, nor with the fluorinating agent and does not dissolve the fluoride formed. To prepare the zirconium tetrafluoride, it is possible to introduce in toluene, gaseous $Zr(BH_4)_4$ entrained by argon from the container and HF vapor also entrained by the argon from the other container. $ZrF_4$ precipitates in the toluene and is separated on the filter.

17 Claims, 1 Drawing Sheet

PROCESS FOR THE PREPARATION OF METAL FLUORIDES USABLE FOR THE PRODUCTION OF FLUORIDE GLASSES

BACKGROUND OF THE INVENTION

The present invention relates to a process for the preparation of hydrated or non-hydrated, metal fluorides more particularly usable for the production of fluoride glasses.

More specifically, it relates to a process for the continuous preparation of metal fluorides which can easily be separated from the reaction medium and it more particularly applies to the preparation of fluorides usable for the production of fluoride glasses, such as fluorides of zirconium, aluminium, rare earths, such as lanthanum, and alkaline earth metals, such as barium.

Various processes are known for the preparation of metal fluorides, but they are not generally suitable for the continuous production of fluorides, because the fluoride obtained is difficult to separate from the reaction medium.

Thus, U.s. Pat. No. 2 639 218 describes a process for the productin of anhydrous zirconium fluoride consisting of reacting the zirconium oxide or zirconyl chloride with an aqueous hydrofluoric acid solution, then heating the reaction medium to dry it and calcining the dry product obtained. Thus, in this process it is necessary to completely dry the reaction medium to recover the product and this does not permit the continuous production of zirconium tetrafluoride.

French Pat. No. 2 059 672 illustrates a process for the preparation of zirconium tetrafluoride consisting of reacting a zirconyl nitrate solution in nitric acid with hydrofluoric acid operating at a temperature of at least 30° C., then separating the monohydrated zirconium tetrafluoride and drying the same.

This preparation mode can be adapted to the continuous production of zirconium tetrafluoride, but it requires the use of a relatively complex assembly for the preparation of the zirconyl nitrate solution in nitric acid and for the separation of the products.

U.S. Pat. No. 2 789 882 illustrates the preparation of zirconium tetrafluoride by the reaction of zirconium tetrachloride in suspension in an organic liquid with gaseous hydrofluoric acid. This gives a zirconium tetrafluoride precipitate, but the latter can be polluted by the solid reagent ($ZrCl_4$) in suspension. Moreover, it is not possible to obtain a fine precipitate of $ZrF_4$.

SUMMARY OF THE INVENTION

The present invention relates to a process for the preparation of metal fluorides permitting the continuous production of fluorides which can be easily separated from the reaction medium and thus obviates the disadvantages of the aforementioned processes.

The present invention therefore relates to a process for the preparation of a metal fluoride, wherein it comprises:

(1) reacting, in an organic liquid medium, (a) a compound of said metal chosen from among the gaseous compounds of said metal, the compounds of said metal soluble in the organic liquid medium and the compounds of said metal in solution in an organic solvent miscible with said medium and (b) a fluorinating agent chosen from among gaseous fluorinating agents, fluorinating agents partly soluble in the organic medium and fluorinating agents partly soluble in an organic solvent miscible with said medium, for forming in the organic medium a fluoride precipitate of said metal, the organic liquid medium being such that it reacts neither with the compound of the metal, nor with the fluorinating agent and does not dissolve the fluoride formed, and (2) separating the metal fluoride from the organic liquid medium.

The use in the inventive process of an organic liquid medium and reagents having these characteristics makes it possible to obtain a homogeneous reaction. The metal fluoride produced in precipitate form can be easily separated from the reaction medium without being polluted by the reagents, because the latter are gaseous or dissolved in the organic medium. Moreover, the product obtained generally has a large specific surface and a good homogeneity, which is advantageous for certain applications. Moreover, the process according to the invention can be performed continuously without it being necessary to use a complex installation at temperatures close to ambient temperature.

Preferably, in the case where the fluorination reaction is exothermic, use is made of an organic liquid medium having a relatively low solidification point, which can thus be brought to a low temperature, e.g. −5 to +5° C. for absorbing the calories of the reaction.

It is preferable to choose an organic liquid medium having a low volatility at the temperature of the fluorination reaction, so that said medium is not entrained with the gaseous products of the reaction. Thus, the organic medium is chosen as a function of the reagents used and the fluoride to be formed. Its choice is also dependent on the reaction conditions.

For example, this organic liquid medium can comprise an aliphatic or aromatic hydrocarbon, such as toluene, or a perfluoric liquid, such as hydrocarbon derivatives containing chlorine and fluorine, such as the products marketed under the trade name Fréon.

The fluorinating agents which can be used are anhydrous or hydrated fluorinating gases such as $F_2$, HF, ClF, $BF_3$, $NF_3$, $COF_2$ and $SF_4$.

It is also possible to use liquid fluorinating agents, e.g. an aqueous hydrofluoric acid solution, or a solution of the fluorinating agent in an appropriate organic solvent, which is miscible with the organic medium used for the reaction.

The metal compounds which can be used in the invention can be of different types, provided that they are able to react with a fluorinating agent to form the sought metal fluoride. In particular, it is possible to use borohydrides of the metal, but also chlorides, bromides, oxychlorides, etc. Thus, in the case where the metal is zirconium, it is possible to use as the starting compound, compounds of formulas:

$ZrCl_4$, $Zr(RBH_3)_4$ and $R'_x (BH_4)_{4-x} Zr$ in which R represents a hydrogen atom, a halogen atom, an alkyl radical, a cycloalkyl radical, a cycloalkenyl radical or an aryl radical, R' represents a cycloalkenyl radical and x=1, 2 or 3.

In the case where the metal fluoride to be formed is an aluminium fluoride, it is possible to use $AlCl_3$ or $Al(BH_4)_3$ as the starting compound.

The use of zirconium and aluminium borohydrides in accordance with the above formulas is particularly interesting, when the zirconium or aluminium fluoride produced has to be used for the production of fluoride glasses.

Thus, for said preparation, it is necessary to limit the presence of impurities to very low values in order to minimize losses by absorption when the fluoride glasses are to be used in the production of optical fibers for the transmission of signals. The zirconium and aluminium borohydrides referred to hereinbefore make it possible to obtain a high degree of purity and thus permit the formation of zirconium tetrafluoride or aluminium trifluoride also having a high degree of purity.

The zirconium borohydrides of formula $Zr(RBH_3)_4$ used as the starting products for the fluorination can be synthesized by conventional methods, such as that described by H. R. Hoekstra and J. J. Katz in J. AM. Chem. Soc. 71, 2488, 1949 or that described by W. E. Reid, J. M. Bish and A. Brenner in J. Electrochem. Soc. 21, 1957.

Preferably, the zirconium compound is prepared by the reaction of $Li(BH_3R)$ with zirconium tetrachloride in accordance with the following reaction diagram:

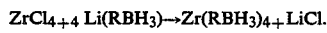

$$ZrCl_4 + 4 Li(RBH_3) \rightarrow Zr(RBH_3)_4 + LiCl.$$

The zirconium compounds of formula $R'_x(BH_4)_{4-x}Zr$ can be prepared by conventional methods, like those described by B. D. James and B. E. Smith in Syn. React. Inorg. Metal-org. chem., 4(5), pp 461–465, 1974.

In order to realize the process of the invention, it is possible to envisage several embodiments more particularly dependent on the nature of the starting compounds used, because the latter can either both be gaseous, or both be liquid, or one can be gaseous and the other liquid.

According to a first embodiment of the inventive process, use is made of a gaseous compound of the metal optionally diluted in an inert gas. In this case, the reaction can be performed in the gaseous phase by simultaneously introducing into the organic liquid medium, the gaseous compound of the metal and a gaseous fluorinating agent. Preferably, the gaseous compound of the metal and the gaseous fluorinating agent are diluted in an inert gas, which can be chosen from among nitrogen and rare gases, e.g. argon. It is also possible to carry out this reaction with the metal compound in the gaseous phase and the fluorinating agent in the liquid phase. In this case, there is simultaneous introduction into the organic liquid medium of the gaseous compound of the metal optionally diluted in an inert gas and a liquid fluorinating agent, which can e.g. be an aqueous hydrofluoric acid solution.

This first embodiment of the inventive process can in particular be used for the production of hydrated or non-hydrated zirconium tetrafluoride $ZrF_4$ and aluminium trifluoride $AlF_3$ by using as the starting compound zirconium borohydride $Zr(BH_4)_4$ or aluminium borohydride $Al(BH_4)_3$ diluted in an inert gas. The fluorinating agent can be hydrated or non-hydrated hydrofluoric acid vapor, or an aqueous hydrofluoric acid solution.

According to a second embodiment of the inventive process, use is made of a metal compound which is soluble in the organic liquid medium. In this case, it is either possible to carry out the reaction by using two liquid phases, or to carry out the reaction by using a liquid phase and a gaseous phase. In the first case, there is simultaneous introduction into the organic liquid medium of a solution of the compound in said organic liquid and a liquid fluorinating agent. In the second case, there is simultaneous introduction into the organic liquid medium of a solution of the compound in said organic liquid and a gaseous fluorinating agent.

This second embodiment of the process can be more particularly used for the preparation of zirconium tetrafluoride $ZrF_4$ and aluminium trifluoride $AlF_3$ using as the starting compound zirconium borohydride $Zr(BH_4)_4$ or aluminium borohydride $Al(BH_4)_3$ and an organic liquid medium constitutued by toluene, in which these borohydrides are soluble. When the fluorinating agent is liquid, it is possible to e.g. use an aqueous hydrofluoric acid solution. When the fluorinating agent is gaseous, it is possible to use hydrofluoric acid vapor diluted in an inert gas.

According to a third embodiment of the inventive process, use is made of a metal compound which is not soluble in the organic liquid medium. In this case, it is necessary to dissolve this compound in a complexing solvent in order to form a solution of the compound miscible with the organic liquid medium and it is then possible to carry out the reaction by using either a liquid phase and a gaseous phase, or two liquid phases.

In the first case, there is simultaneous introduction into the organic liquid medium of the solution of the compound in the complexing solvent and a gaseous fluorinating agent optionally diluted in an inert gas. In the second case, there is simultaneous introduction into the organic liquid medium of the solution of the compound in the complexing solvent and a liquid fluorinating agent.

This third embodiment of the process is more particularly applicable to the production of zirconium tetrafluoride $ZrF_4$ and aluminium trifluoride $AlF_3$ starting with zirconium and aluminium compounds, such as zirconium chloride $ZrCl_4$ and aluminium chloride $AlCl_3$ dissolved in acetonitrile, which makes it possible to obtain a solution of $ZrCl_4$ or $AlCl_3$ soluble in an organic medium, such as toluene.

The pressure and temperature conditions used in the different embodiment of the inventive process are in particular dependent on the starting compounds used and the exothermicity of the reaction. Generally working takes place at temperatures ranging from $-40°$ C. to ambient temperature and atmospheric or slightly higher pressure.

In all these embodiments of the invention, the organic liquid medium preferably represents at least 50% by weight of the reaction medium constituted by the organic liquid and the reagents used.

The inventive process has numerous advantages. Thus, in view of the fact that fluorination takes place within a non-aqueous medium, it is possible to modify the kinetics of the fluorination reaction by changing the temperature of the medium and by adjusting the introduction rate of the metal compound and the fluorinating agent, as well as their possible dilution in a solvent or an inert gas.

The gaseous by-products of the reaction such as $B_2H_6$, $BF_3$, $H_2$, HF and $Cl_2$ can be continuously eliminated from the reaction medium and it is also possible to separate from the latter the product formed, e.g. hydrated or non-hydrated $ZrF_4$ or $AlF_3$ by using simple methods, e.g. settling or filtering.

Finally, fluorination can take place at ambient temperature or a lower temperature, it not being necessary to use a reactor made from a material which resists high temperatures and it is more particulatly possible to use reactors made from different polymers, e.g. polyethylene or fluorinated polymer, which are inert with respect to the reagents used and which introduce no disturbing impurity for use of fluoride glass optical fibers.

The inventive process can be used for the preparation of numerous hydrated or non-hydrated metal fluorides and in particular for the production of fluorides of metals such as zirconium tetrafluoride, aluminium fluoride, fluorides of alkaline earth metals, e.g. barium fluoride and fluorides of rare earths, such as lanthanum fluoride. The obtaining of a hydrated fluoride is more particularly dependent on the starting reagents and more particularly the nature of the fluorinating agent used. Thus, when using as the fluorinating agent hydrated hydrofluoric acid vapor or an aqueous hydrofluoric acid solution, generally a hydrated fluoride is obtained. This can be purified and transformed into anhydrous fluoride by appropriate treatments, e.g. by heating to approximately 300° C. under an anhydrous HF atmosphere.

The inventive process also offers the possibility of obtaining very pure fluorides, more especially by choosing either very pure starting compounds, or an appropriate organic liquid medium.

Thus, if the starting metal compound contains certain impurities which would give rise to the formation of fluoric impurities during the fluorination reaction, it is possible to eliminate these fluoride impurities formed by choosing an organic liquid medium in which these impurities have a different solubility from the sought fluoride.

BRIEF DESCRIPTION OF THE DRAWINGS

The invention is described in greater detail hereinafter relative to non-limitative embodiments and the attached drawings, wherein show.

DETAILED DESCRIPTION OF EXEMPLIFIED EMBODIMENTS

EXAMPLE 1 Preparation of ZrF$_4$, 3H$_2$O

Figure 1:
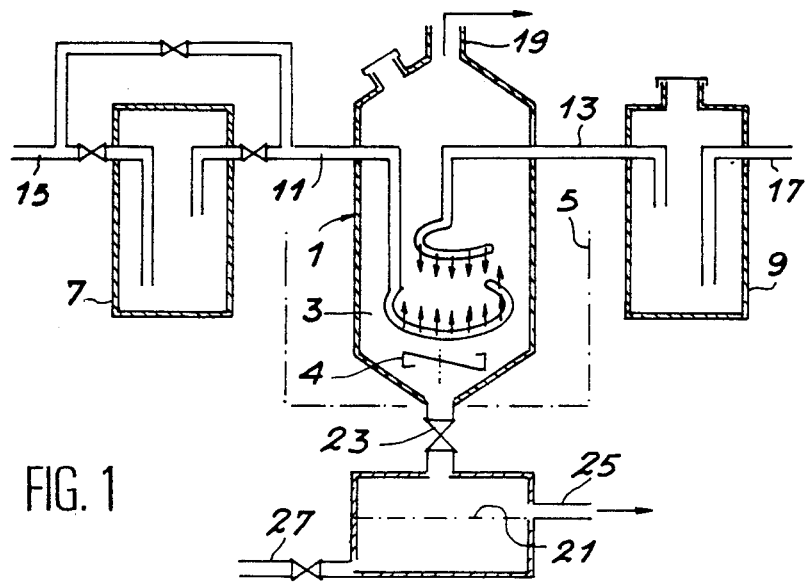
FIG. 1 Diagrammatically an installation for the preparation of metal fluoride according to the first embodiment of the invention.

In this example, use is made of the first embodiment of the inventive process and the installation shown in FIG. 1 by introducing the metal compound and the fluorinating agent in the gaseous phase with argon. The organic liquid medium is constituted by toluene, the zirconium compound is Zr(BH$_4$)$_4$ and the fluorinating agent is hydrated hydrofluoric acid vapor.

FIG. 1 shows that the installation comprises a reactor 1 containing the organic liquid medium 3 constituted by toluene, which can be stirred by stirrer 4 and maintained at an appropriate temperature by means of a thermostatically controlled bath 5. The reagents used constituted by Zr(BH$_4$)$_4$ and HF in aqueous form are respectively stored in containers 7 and 9 and can be introduced into reactor 1 by pipes 11, 13 being displaced by a dry argon stream introduced into containers 7, 9 by pipes 15, 17. Pipes 11, 13 issue into reactor 1 and below the level of the toluene, being reciprocally arranged in such a way that the two gases leaving said pipes can react with one another within the toluene. The upper part of reactor 1 is provided with a pipe 19 for the discharge of the gaseous products of the reaction and appropriate not shown means making it possible to regulate the pressure of the two argon streams introduced into reactor 1.

In this example, 4g of Zr(BH$_4$)$_4$ are placed in container 7 and an aqueous 40% HF solution in container 9. Reactor 1 contains 50 ml of toluene kept at approximately 0° C. by bath 5. There is a continuous introduction of an argon stream into containers 7 and 9 at a pressure exceeding 18.9 kPa for extracting the Zr(BH$_4$)$_4$ and the hydrofluoric acid vapor and for the installation thereof into reactor 1 and this introduction continues for one hour.

At the end of the operation, the liquid medium 3 within which has precipitated the product ZrF$_4$, 3H$_2$O is allowed to flow into filter 21 by opening valve 23 and thus the solid ZrF$_4$, 3H$_2$O product is collected and can be discharged from the installation by pipe 25, while the toluene can be recovered by pipe 27 and recycled in reactor 1. Thus, 5 g of ZrF$_4$, 3H$_2$O are recovered and can be dehydrated into ZrF$_4$ H$_2$O by argon scavenging at 200° C.

This installation can be used under the same conditions for preparig aluminium trifluoride AlF$_3$, while starting with Al(BH$_4$)$_3$ and a hydrofluoric acid solution and by using toluene as the organic liquid medium.

In this installation, the products from the reaction are in this case B$_2$H$_6$, BF$_3$, H$_2$ and HF, which are discharged from reactor 1 with the argon by pipe 19.

In this installation, it is also possible to carry out the reaction by directly introducing the hydrofluoric acid in liquid form into the toluene 3.

EXAMPLE 2

Preparation of ZrF$_4$, 3H$_2$O

Figure 2:
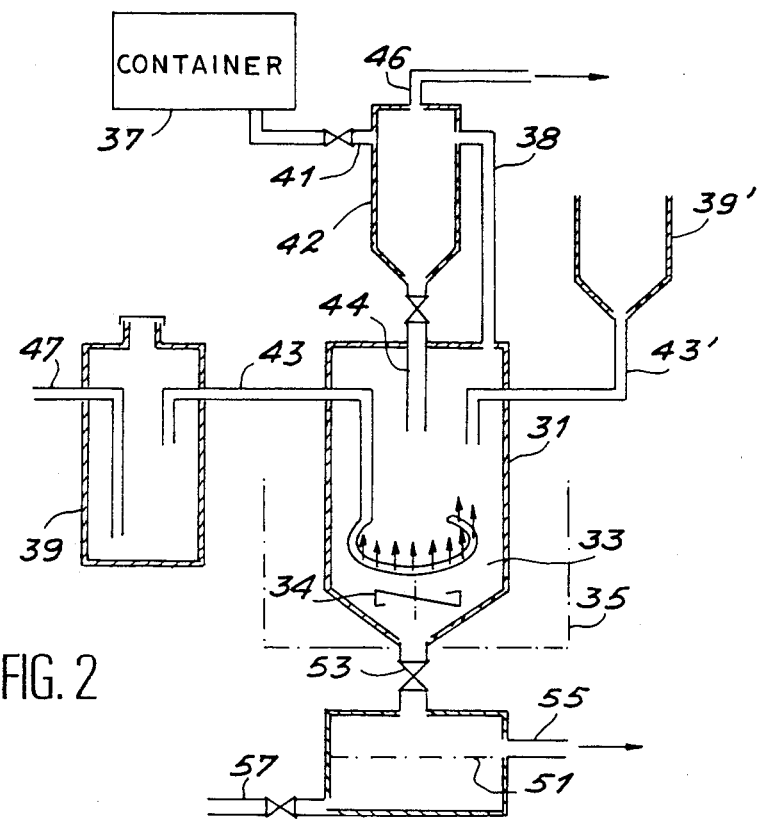
FIG. 2 Diagrammatically an installation suitable for performing the second embodiment and third embodiment of the inventive process.

In this example, use is made of the second embodiment of the inventive process and the installation shown in FIG. 2. In this case, the reagents used are a solution of Zr(BH$_4$)$_4$ in toluene and the fluorinating agent is hydrated hydrofluoric acid vapor diluted by argon.

As in FIG. 1, the installation shown in FIG. 2 comprises a reactor 31 containing toluene 33, maintained at the desired temperature by a thermostatically controlled bath 35 and stirred by stirrer 34. This reactor is connected in its lower part by a pipe equipped with a valve 53 to a filter 51, identical to that of FIG. 1, which also comprises a pipe 55 for discharging the solids and a pipe 57 for discharging the toluene. The Zr(BH$_4$)$_4$ solution in toluene is stored in a container 37 and can be introduced into reactor 31 by a pipe 41, an intermediate container 42 provided in its lower part with a pipe 44, which issues into reactor 31 above the toluene level. The hydrated hydrofluoric acid vapors can be introduced into reactor 31 from container 39 containing an aqueous 40% HF solution by means of an argon stream introduced by pipe 47 which is charged in container 39 with hydrated hydrofluoric acid vapor and which is then introduced into reactor 31 by pipe 43. The latter issues into the reactor below the toluene level, so as to permit the escape of gas facing pipe 44.

The gaseous products from the reaction can be discharged by pipe 38, which issues into the intermediate container 42 and can then be discharged by pipe 46.

In this example, reactor 31 contains toluene maintained at approximately 0° C. and there is a simultaneous introduction into the latter of the argon stream containing hydrated HF vapor under a pressure exceeding 100 torrs and the Zr(BH$_4$)$_4$ solution, while regulating the flow rate of said solution to operate with a fluorinating agent excess.

Thus, $ZrF_4$, $3H_2O$ is obtained, which is precipitated in toluene 33 with an 80% yield.

At the end of the operation, the $ZrF_4$, $3H_2O$-containing reaction medium 33 is filtered, the toluene is recovered by pipe 57 and is recycled in reactor 1. It is then possible to wash the $ZrF_4$, $3H_2O$ by means of water to eliminate $BO_3H_3$.

According to a variant, it is possible to use as the fluorinating agent the aqueous 40% hydrofluoric acid solution by introducing it directly into reactor 1 e.g. from a container 39' and a pipe 43' issuing into the reactor above the toluene level in the vicinity of pipe 44. In the same way, it is possible to use this installation for the preparation of $AlF_3$ by using in container 37 a solution of $Al(BH_4)3$ in toluene.

EXAMPLE 3

Preparation of hydrated $ZrF_4$

In this example, use is made of the third embodiment of the inventive process and the installation shown in FIG. 2. The zirconium compound is $ZrCl_4$, which is previously dissolved in acetonitrile and which is stored in container 37. As in example 2, the fluorinating agent is constituted by hydrated hydrofluoric acid vapor entrained by argon.

6 g of $ZrCl_4$ dissolved in 100 cc of $CH_3CN$ are placed in container 37 and said solution is introduced into reactor 31, which contains the toluene, at the same time as the hydrated HF vapor-charged argon stream from container 39. The reactor is maintained at a temperature close to 0° C. and in this way precipitation takes place in toluene 33 of the hydrated $ZrF_4$, which can be in the form $ZrF_4$, $1H_2O$ or $ZrF_4$, $3H_2O$. This precipitate is separated from the solution, as in example 2 and is washed to eliminate the $BO_3H_3$ and is dried in vacuo. The yield is 83%.

EXAMPLE 4

Preparation of hydrated $AlF_3$

In this example, the same operating procedure as in example 3 is used, but the solution present in container 37 is formed from 2.3g of $AlCl_3$ dissolved in 30 cc of $CH_3CN$. The liquid medium 33 is toluene, which is maintained once again at 0° C. and the same fluorinating agent and pressure conditions as in example 2 are used.

Thus, in the toluene is precipitated hydrated $AlF_3$ (in the alpha and beta form, $3H_2O$), which is separated as in example 3 and washed to eliminate $BO_3H_3$. The yield exceeds 70%.

What is claimed is:

1. A process for the preparation of a metal fluoride, wherein it comprises:
    (1) reacting, in an organic liquid medium comprising an aliphatic or aromatic hydrocarbon or a perfluorinated liquid,
    (a) a compound of said metal able to react with a fluorinating agent and chosen from among the compounds of said metal that are gaseous at room temperature, the compounds of said metal soluble in the organic liquid medium and the compounds of said metal soluble in an organic solvent miscible with said medium, said compound being selected from the group consisting of borohydrides, chlorides, bromides and oxychlorides of said metal, and
    (b) a fluorinating agent chosen from among gaseous fluorinating agents, fluorinatig agents partly soluble in the organic medium and fluorinating agents partly soluble in an organic solvent miscible with said medium, for forming in the organic medium a fluoride precipitate of said metal, the organic liquid medium being such that it reacts neither with the compound of the metal, nore with the fluorinating agent and does not dissolve the fluoride from the organic liquid medium,
    and
    (2) separating the metal fluoride from the organic liquid medium.

2. A process according to claim 1, wherein the organic liquid medium comprises toluene.

3. A process according to claim 1, wherein the metal is zirconium.

4. A process according to claim 3, wherein the zirconium compound is chosen from among the compounds of formulas:
$ZrCl_4$, $Zr(RBH_3)_4$ and $R'_x (BH_4)_{4-x}Zr$ in which R represents a hydrogen atom, a halogen atom, an alkyl radical, a cycloalkyl radical, a cycloalkenyl radical or an aryl radical, R' represents a cycloalkenyl radical and $x=1$, 2 or 3.

5. A process according to claim 1, wherein the metal is aluminium.

6. A process according to claim 5, wherein the aluminium compound is $AlCl_3$ or $Al(BH_4)_3$.

7. A process according to claim 3, wherein use is made of a gaseous compound of said metal and wherein simultaneous introduction takes place into the organic liquid medium of the gaseous compound of said metal and a gaseous or liquid fluorinating agent.

8. A process according to claim 7, wherein the gaseous compound of said metal is diluted in an inert gas.

9. A process according to claim 8, wherein the metal compound is chosen from among zirconium borohydride $Zr(BH_4)_4$ and aluminium borohydride $Al(BH_4)_3$.

10. A process according to claim 1, wherein use is made of a compound of said metal soluble in said medium and wherein there is simultaneous introduction into the organic liquid medium of a solution of said compound in said organic liquid medium and a gaseous or liquid fluorinating agent.

11. A process according to claim 10, wherein the metal compound is zirconium borohydride $Zr(BH_4)_4$ or aluminium borohydride $Al(BH_4)_3$ and wherein the organic liquid medium is toluene.

12. A process according to either of the claims 3 and 5, wherein use is made of a compound of said metal soluble in an organic solvent miscible with said organic liquid medium, wherein said compound is dissolved in said organic solvent to form a solution of the compound miscible with said organic liquid medium and wherein there is simultaneous introduction into the organic liquid medium of the solution of the compound and a gaseous or liquid fluorinating agent.

13. A process according to claim 12, wherein the metal compound is $ZrCL_4$ or $AlCl_3$ and wherein said compound is dissolved in acetonitrile.

14. A process according to claim 1, wherein the organic liquid medium is toluene.

15. A process according to claim 1, wherein the fluorinating agent is a gaseous compound chosen from among $F_2$, HF, ClF, $BF_3$, $NF_3$, $COF_2$ and $SF_4$.

16. A process according to claim 15, wherein the fluorinating agent is diluted in an inert gas.

17. A process according to claim 1, wherein the fluorinating agent is an aqueous hydrofluoric acid solution.

* * * * *